US012641499B2

(12) United States Patent
Vivanco et al.

(10) Patent No.: US 12,641,499 B2
(45) Date of Patent: May 26, 2026

(54) SYSTEMS AND METHODS FOR DETECTING NON-TERRESTRIAL CELLS AND MANAGING PHYSICAL CELL IDENTITY COLLISION AND NEIGHBORING LIST INTEGRITY IN A HETEROGENEOUS TERRESTRIAL AND SATELLITE WIRELESS COMMUNICATION NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 384 days.

(21) Appl. No.: 18/465,231

(22) Filed: Sep. 12, 2023

(65) Prior Publication Data

US 2025/0088917 A1      Mar. 13, 2025

(51) Int. Cl.
*H04W 36/00* (2009.01)
*H04B 17/318* (2015.01)

(52) U.S. Cl.
CPC ...... *H04W 36/0061* (2013.01); *H04B 17/328* (2023.05)

(58) Field of Classification Search
CPC ........ H04W 36/0061; H04W 36/00835; H04B 17/328
USPC ......................................................... 370/332
See application file for complete search history.

(56) References Cited

U.S. PATENT DOCUMENTS

| | | | |
|---|---|---|---|
| 11,240,689 B1 * | 2/2022 | Shankaranarayanan | ...................... H04W 76/11 |
| 2020/0374770 A1 * | 11/2020 | Vivanco | ................ H04W 24/02 |
| 2022/0159511 A1 * | 5/2022 | Vivanco | ............. H04B 7/18506 |

\* cited by examiner

*Primary Examiner* — Obaidul Huq
(74) *Attorney, Agent, or Firm* — Guntin & Gust, PLC; Miyoung Shin

(57) ABSTRACT

Aspects of the subject disclosure may include, for example, a method including receiving first neighbor cell information from a first user equipment (UE) operating in a first terrestrial service cell, where the first neighbor cell information includes a first physical cell identification (PCI) of a first neighbor cell and a cell type indicator detected by the first user equipment. The method further includes generating a database that cross-references the first PCI, the cell type indicator and a location of the first UE and analyzing a correlation among the first PCI, the cell type indicator and the location of the first UE to identify anomalies indicative of a non-terrestrial neighbor cell. No handover or neighbor list updates may take place for the non-terrestrial neighbor cell. Other embodiments are disclosed.

20 Claims, 13 Drawing Sheets

200

SON 222

Memory   Processor

RAN Intelligent Controller (RIC) 205

Memory   Processor

Neighbor Cell 218

First UE 212

Serving Cell 210

220

219

Second Group of UE 215

Different Cell 216

226

233

| Signature or Pattern or Behavior |
|---|
| First UE 212 detects a neighbor cell and no longer detects the neighbor cell. Second Group of UEs 214 reports the neighbor cell after elapse of a predetermined time interval, |

Neighbor Cell 218

First UE 212

Serving Cell 210

SON 222

Processor

Memory

RAN Intelligent Controller (RIC) 205

Processor

Memory

227

| Signature or Pattern or Behavior | First UE 212 detects the neighbor cell and reports fast RSRP changes. |
| --- | --- |

237

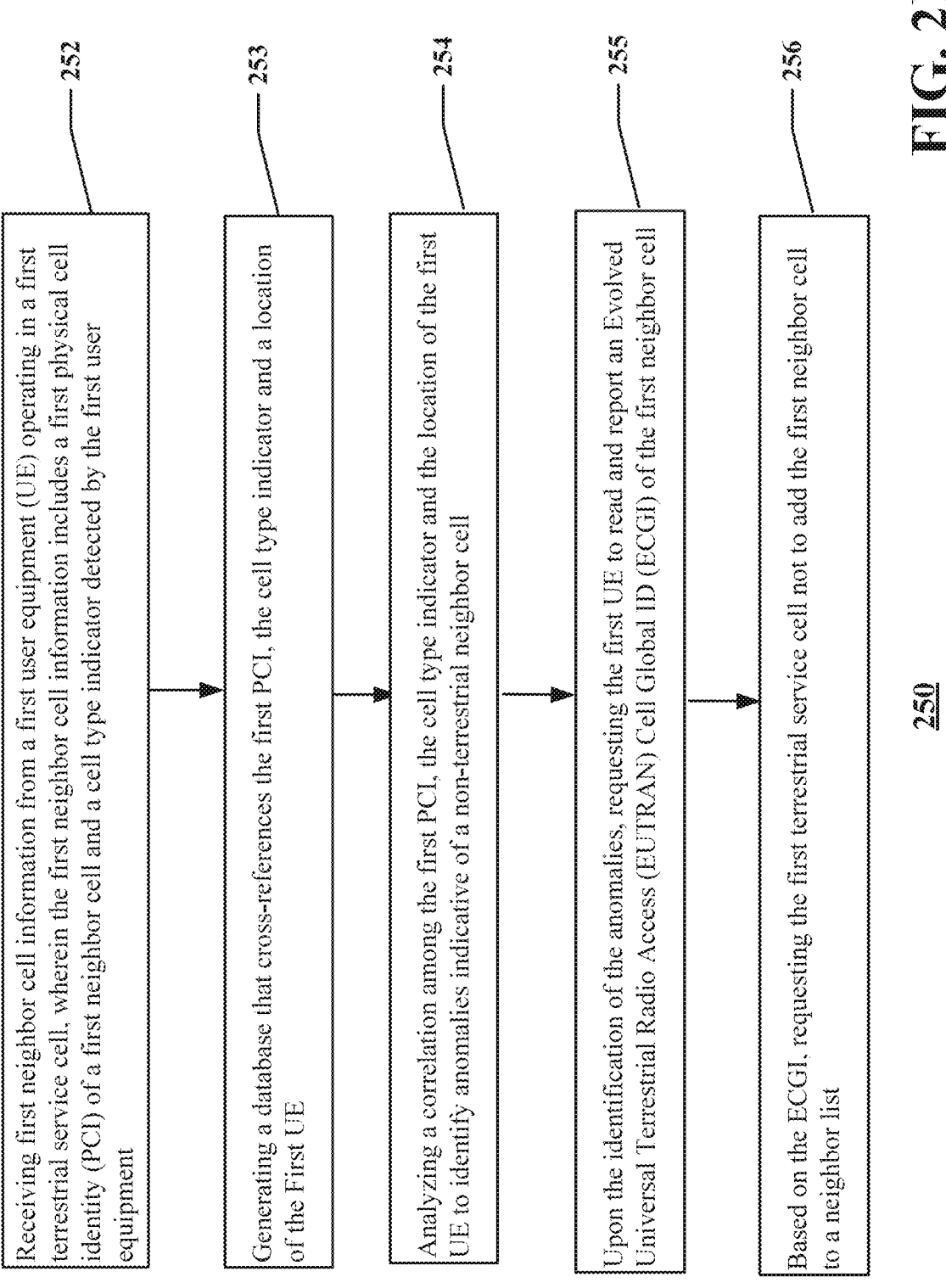

Receiving first neighbor cell information from a first user equipment (UE) operating in a first terrestrial service cell, wherein the first neighbor cell information includes a first physical cell identity (PCI) of a first neighbor cell and a cell type indicator detected by the first user equipment ⟋ 252

Generating a database that cross-references the first PCI, the cell type indicator and a location of the First UE ⟋ 253

Analyzing a correlation among the first PCI, the cell type indicator and the location of the first UE to identify anomalies indicative of a non-terrestrial neighbor cell ⟋ 254

Upon the identification of the anomalies, requesting the first UE to read and report an Evolved Universal Terrestrial Radio Access (EUTRAN) Cell Global ID (ECGI) of the first neighbor cell ⟋ 255

Based on the ECGI, requesting the first terrestrial service cell not to add the first neighbor cell to a neighbor list ⟋ 256

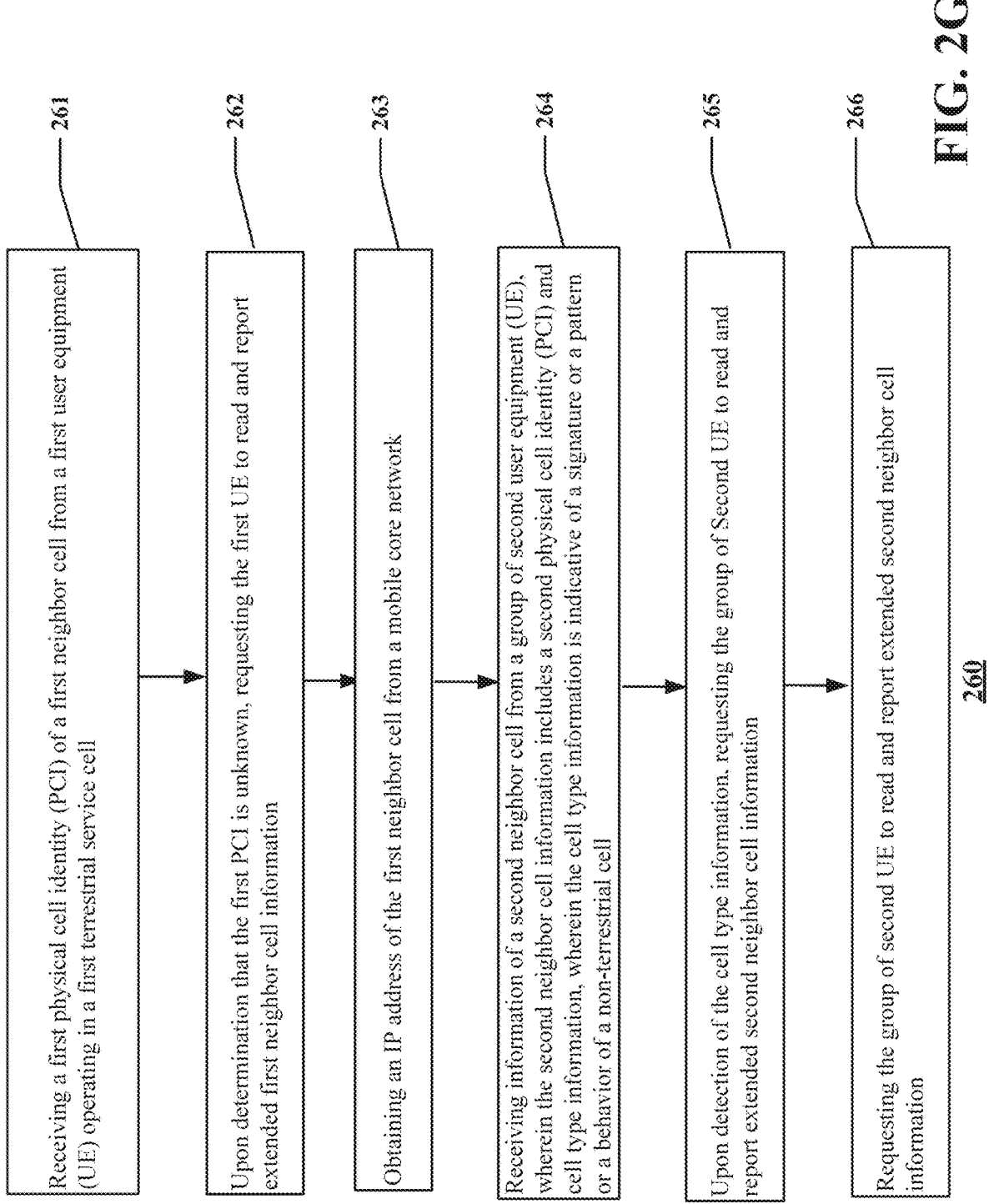

261 — Receiving a first physical cell identity (PCI) of a first neighbor cell from a first user equipment (UE) operating in a first terrestrial service cell 262 — Upon determination that the first PCI is unknown, requesting the first UE to read and report extended first neighbor cell information 263 — Obtaining an IP address of the first neighbor cell from a mobile core network 264 — Receiving information of a second neighbor cell from a group of second user equipment (UE), wherein the second neighbor cell information includes a second physical cell identity (PCI) and cell type information, wherein the cell type information is indicative of a signature or a pattern or a behavior of a non-terrestrial cell 265 — Upon detection of the cell type information, requesting the group of Second UE to read and report extended second neighbor cell information 266 — Requesting the group of second UE to read and report extended second neighbor cell information

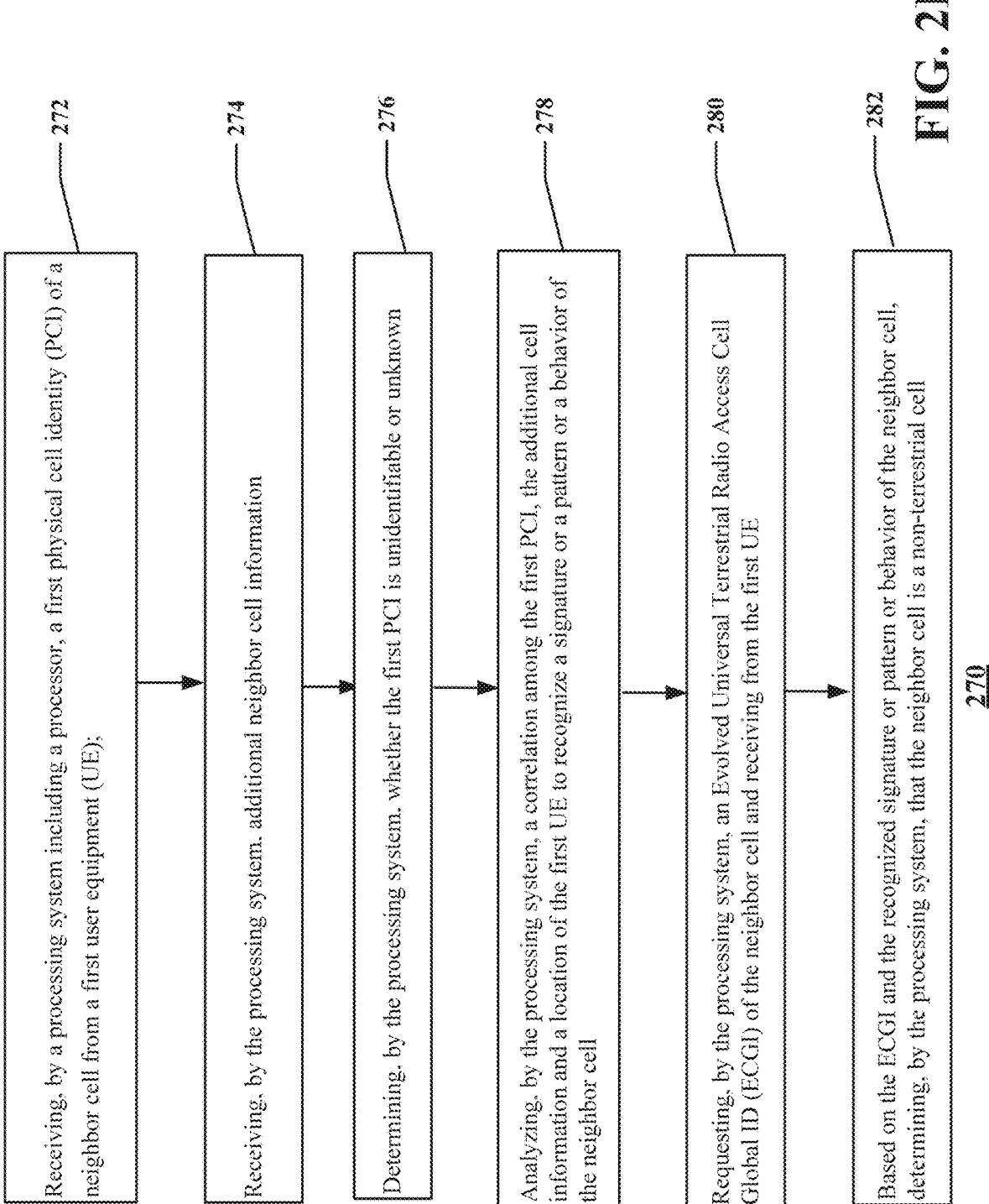

272 — Receiving, by a processing system including a processor, a first physical cell identity (PCI) of a neighbor cell from a first user equipment (UE);

274 — Receiving, by the processing system, additional neighbor cell information

276 — Determining, by the processing system, whether the first PCI is unidentifiable or unknown 278 — Analyzing, by the processing system, a correlation among the first PCI, the additional cell information and a location of the first UE to recognize a signature or a pattern or a behavior of the neighbor cell 280 — Requesting, by the processing system, an Evolved Universal Terrestrial Radio Access Cell Global ID (ECGI) of the neighbor cell and receiving from the first UE 282 — Based on the ECGI and the recognized signature or pattern or behavior of the neighbor cell, determining, by the processing system, that the neighbor cell is a non-terrestrial cell

SYSTEMS AND METHODS FOR DETECTING NON-TERRESTRIAL CELLS AND MANAGING PHYSICAL CELL IDENTITY COLLISION AND NEIGHBORING LIST INTEGRITY IN A HETEROGENEOUS TERRESTRIAL AND SATELLITE WIRELESS COMMUNICATION NETWORKS

FIELD OF THE DISCLOSURE

The subject disclosure relates to detecting non-terrestrial cells in heterogeneous terrestrial and satellite wireless networks using a signature or a pattern or a behavior of the non-terrestrial cells. The subject disclosure further relates to managing physical cell identity collision and neighboring list integrity in the heterogeneous terrestrial and satellite wireless communication networks.

BACKGROUND

In LTE/5G networks, Physical Cell Identities (PCIs) are used to distinguish different cells by user equipment. In the LTE networks, available numbers of PCIs are 504, where as in the 5G networks, available numbers of PCIs have become 1008. As a number of cells in the LTE/5G networks are much larger than available PCIs, several different cells can use the same PCI.

User equipment such as a mobile phone may not distinguish two different cells having the same PCI and using the same frequency. When a particular user equipment in a serving cell can hear two different neighbor cells having the same PCI and using the same frequency, a PCI confusion or collision arises. The PCI confusion or collision may result in failure of a handover and a call drop. The PCI confusion or collision may lead to a neighbor list corruption.

BRIEF DESCRIPTION OF THE DRAWINGS

Reference will now be made to the accompanying drawings, which are not necessarily drawn to scale, and wherein:

FIG. 2F depicts one illustrative embodiment of a method in accordance with various aspects described herein.

FIG. 2G depicts another illustrative embodiment of a method in accordance with various aspects described herein.

FIG. 2H depicts further another illustrative embodiment of a method in accordance with various aspects described herein.

Figure 3:
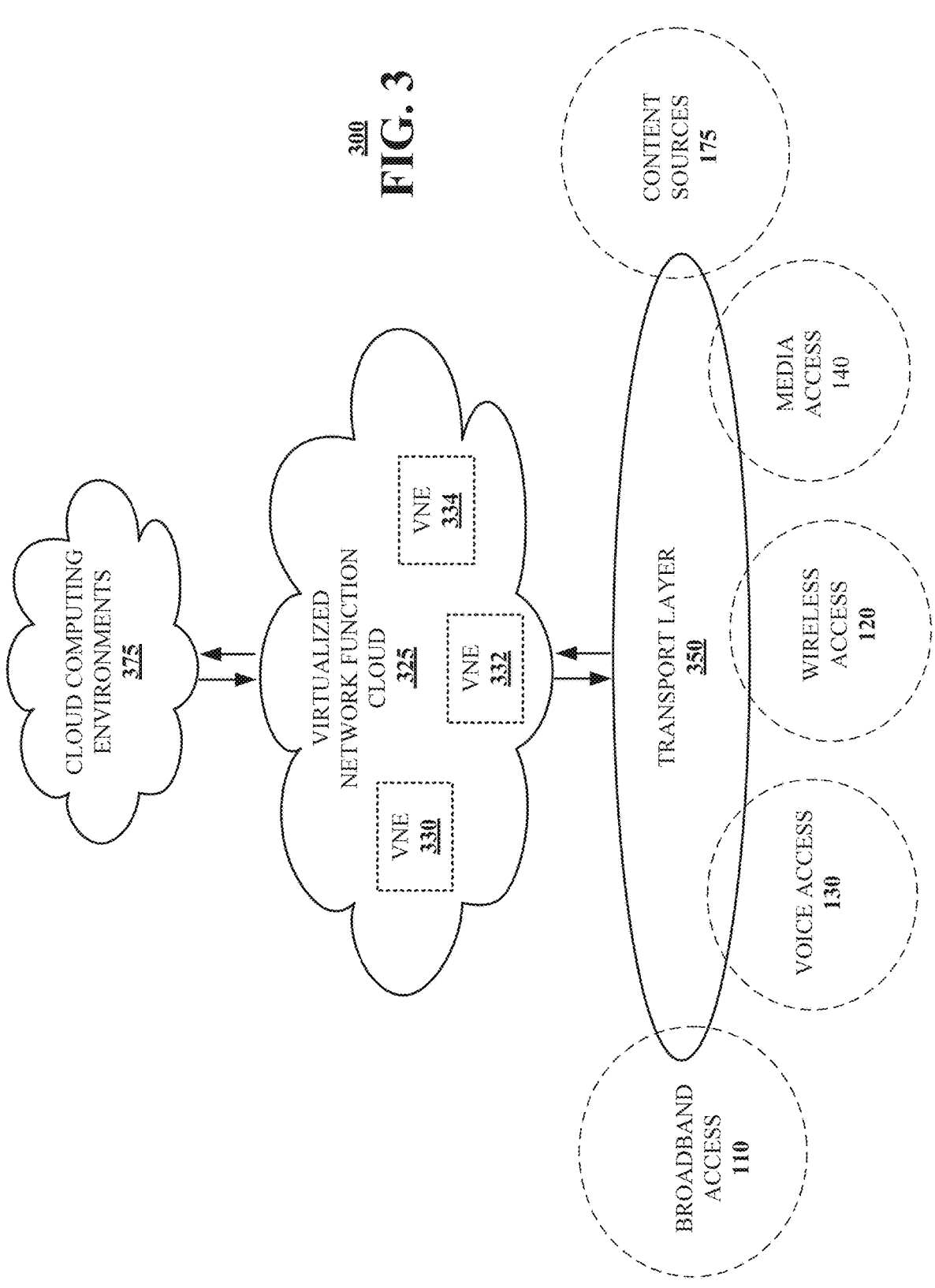

FIG. 3 is a block diagram illustrating an example, non-limiting embodiment of a virtualized communication network in accordance with various aspects described herein.

Figure 4:
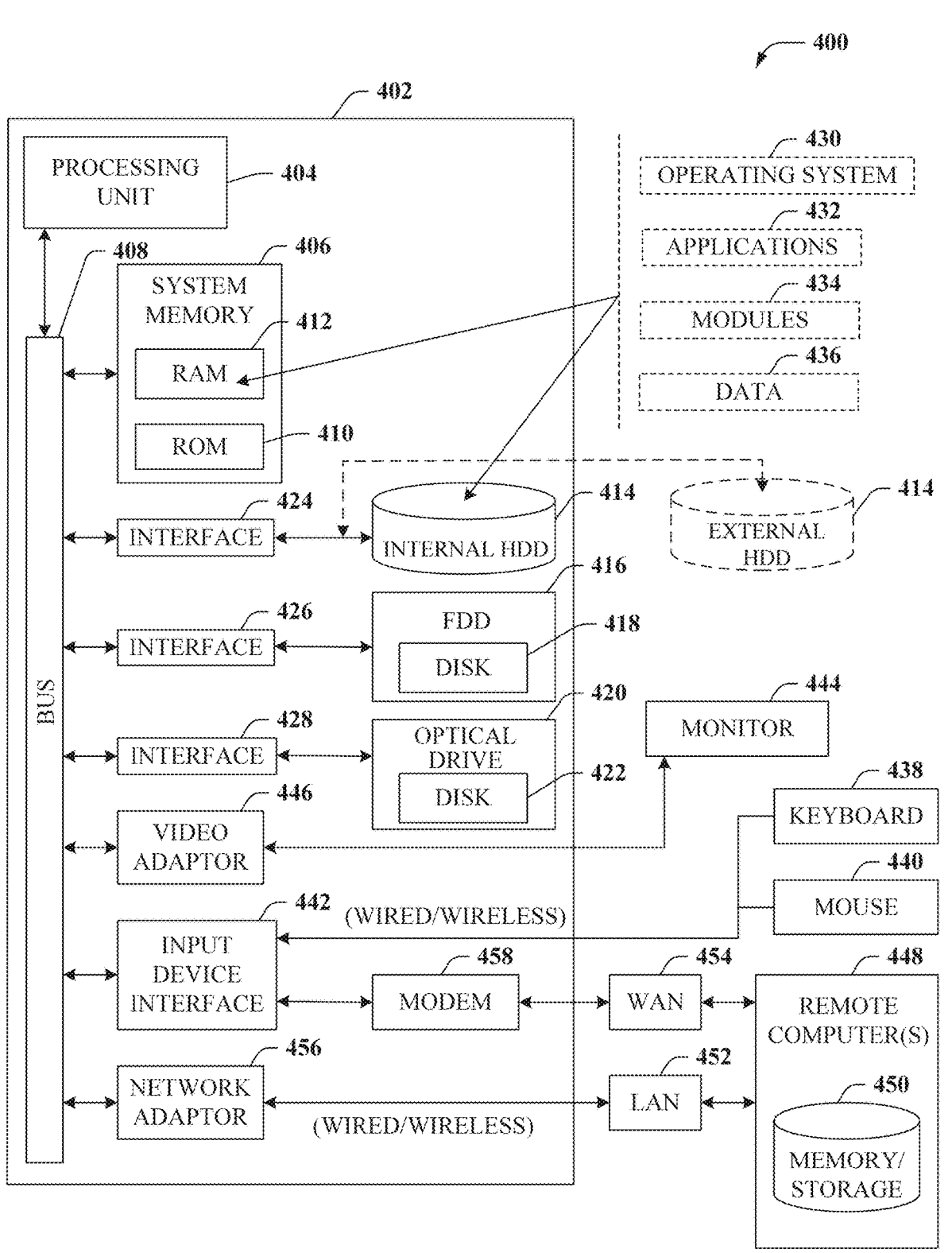

FIG. 4 is a block diagram of an example, non-limiting embodiment of a computing environment in accordance with various aspects described herein.

Figure 5:
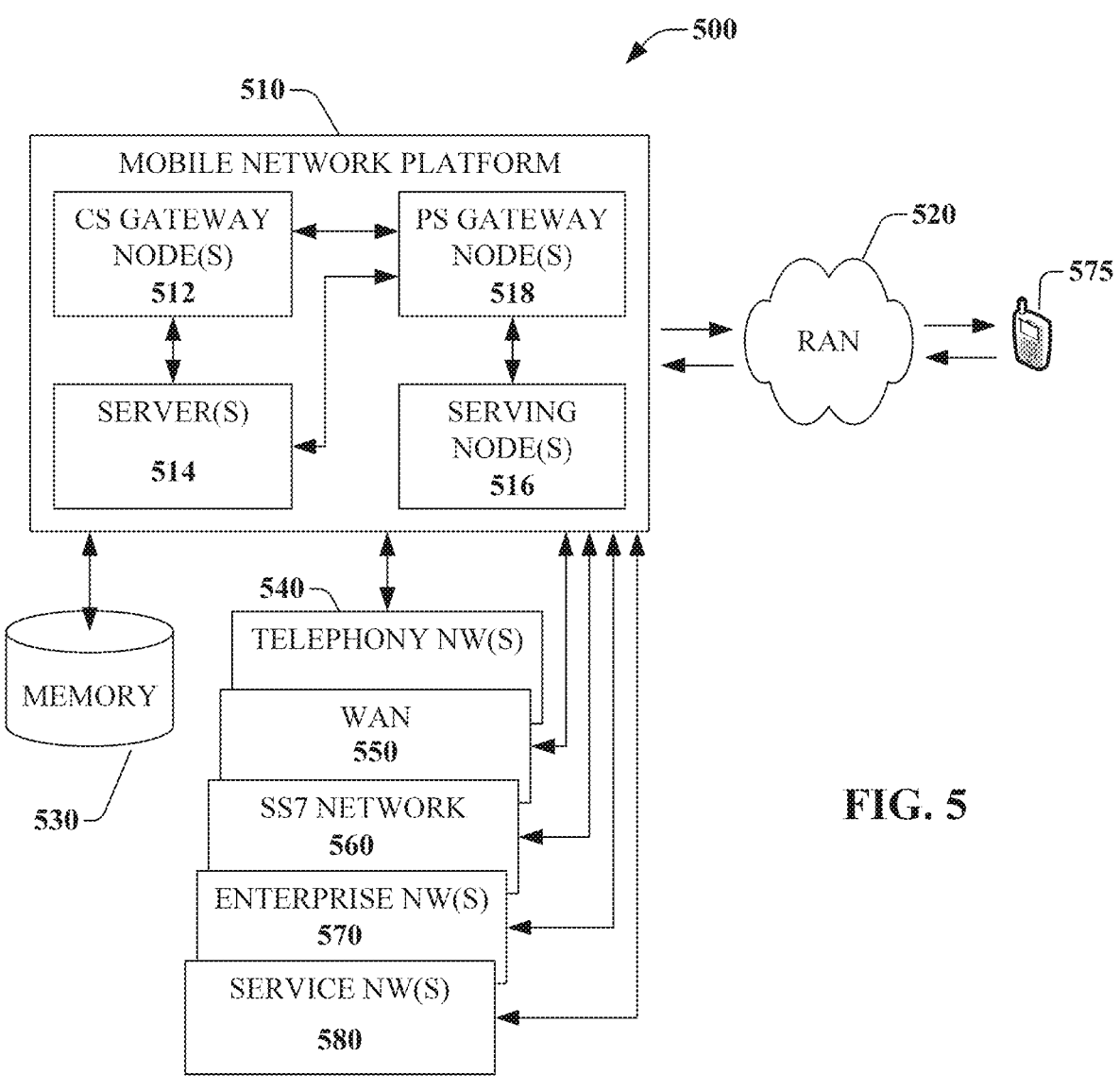

FIG. 5 is a block diagram of an example, non-limiting embodiment of a mobile network platform in accordance with various aspects described herein.

Figure 6:
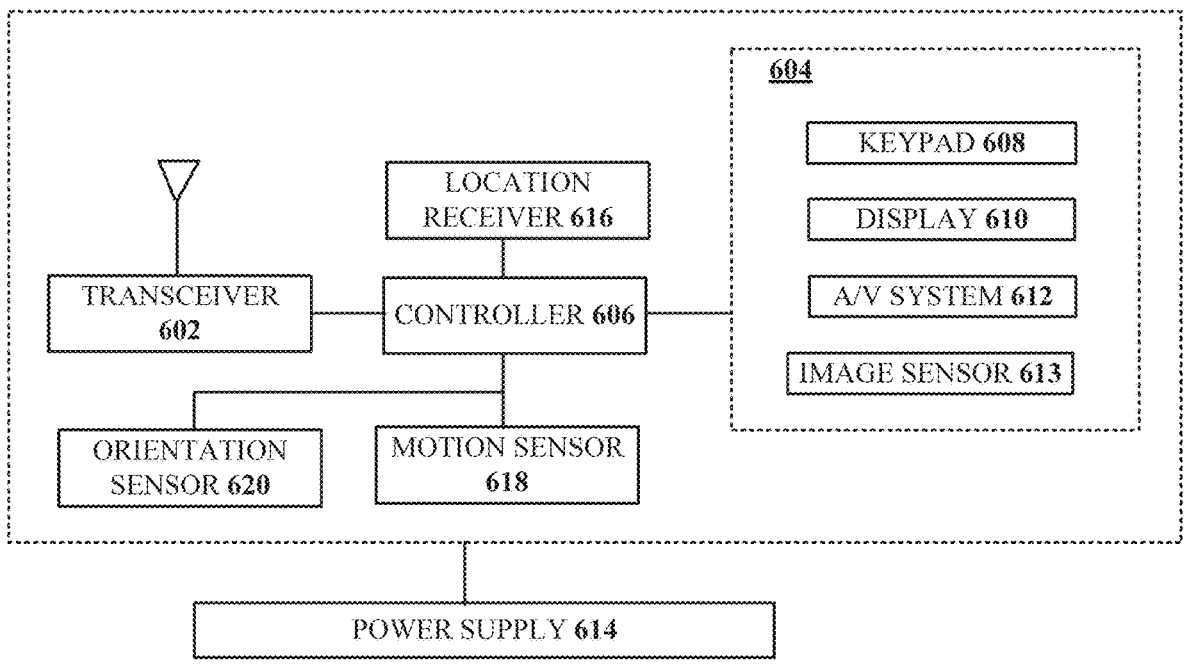

FIG. 6 is a block diagram of an example, non-limiting embodiment of a communication device in accordance with various aspects described herein.

DETAILED DESCRIPTION

The subject disclosure describe, among other things, illustrative embodiments for detecting non-terrestrial cells based on a signature or a pattern or behavior of the non-terrestrial cells by using user equipment as sensing devices. The subject disclosure further describe illustrative embodiments for managing and avoiding physical cell identity confusion and collision and a neighbor list corruption. The subject disclosure describe illustrative embodiments for providing improved Automatic Name Relation processes or mechanisms in heterogeneous terrestrial and satellite wireless communication networks. Other embodiments are described in the subject disclosure.

One or more aspects of the subject disclosure include systems facilitating operations of receiving first neighbor cell information from a first user equipment (UE) operating in a first terrestrial service cell, where the first neighbor cell information includes a first physical cell identity (PCI) of a first neighbor cell and a cell type indicator detected by the first UE, generating a database that cross-references the first PCI, the cell type indicator and a location of the first UE, analyzing a correlation among the first PCI, the cell type indicator and the location of the first UE to identify anomalies indicative of a non-terrestrial neighbor cell, upon the identification of the anomalies, requesting the first UE to read and report an Evolved Universal Terrestrial Radio Access Network (EUTRAN) Cell Global Identifier (ECGI) of the first neighbor cell, and based on the ECGI, requesting the first terrestrial service cell not to add the first neighbor cell to a neighbor list.

One or more aspects of the subject disclosure include a non-transitory machine-readable medium, including executable instructions that, when executed by a processing system including a processor, facilitate performance of operations. The operations include receiving a first physical cell identity (PCI) of a first neighbor cell from a first user equipment (UE) operating in a first terrestrial service cell, upon determination that the first PCI is unknown, requesting the first UE to read and report extended first neighbor cell information, and obtaining an IP address of the first neighbor cell from a mobile core network, receiving information of a second neighbor cell from a group of second user equipment (UE), where the second neighbor cell information includes a second physical cell identity (PCI) and cell type information, where the cell type information is indicative of a signature or a pattern or a behavior of a non-terrestrial cell, upon detection of the cell type information, requesting the group of second UE to read and report extended second neighbor cell information, and requesting the first terrestrial service cell to add a neighboring list entry of the first neighbor cell to a neighbor list (NL), and forgo to add a neighboring list entry of the second neighbor cell to the neighbor list.

One or more aspects of the subject disclosure include methods including steps of receiving, by a processing system including a processor, a first physical cell identity (PCI) of a neighbor cell from a first user equipment (UE), receiving, by the processing system, additional neighbor cell information, determining, by the processing system, whether the first PCI is unidentifiable or unknown, analyzing, by the processing system, a correlation among the first PCI, the additional cell information and a location of the first UE to recognize a signature or a pattern or a behavior of the neighbor cell, requesting, by the processing system, an Evolved Universal Terrestrial Radio Access Network (EU-TRAN) Cell Global Identifier (ECGI) of the neighbor cell and receiving from the first UE, and based on the ECGI and the recognized signature or pattern or behavior of the neighbor cell, determining, by the processing system, that the neighbor cell is a non-terrestrial cell.

Figure 1:
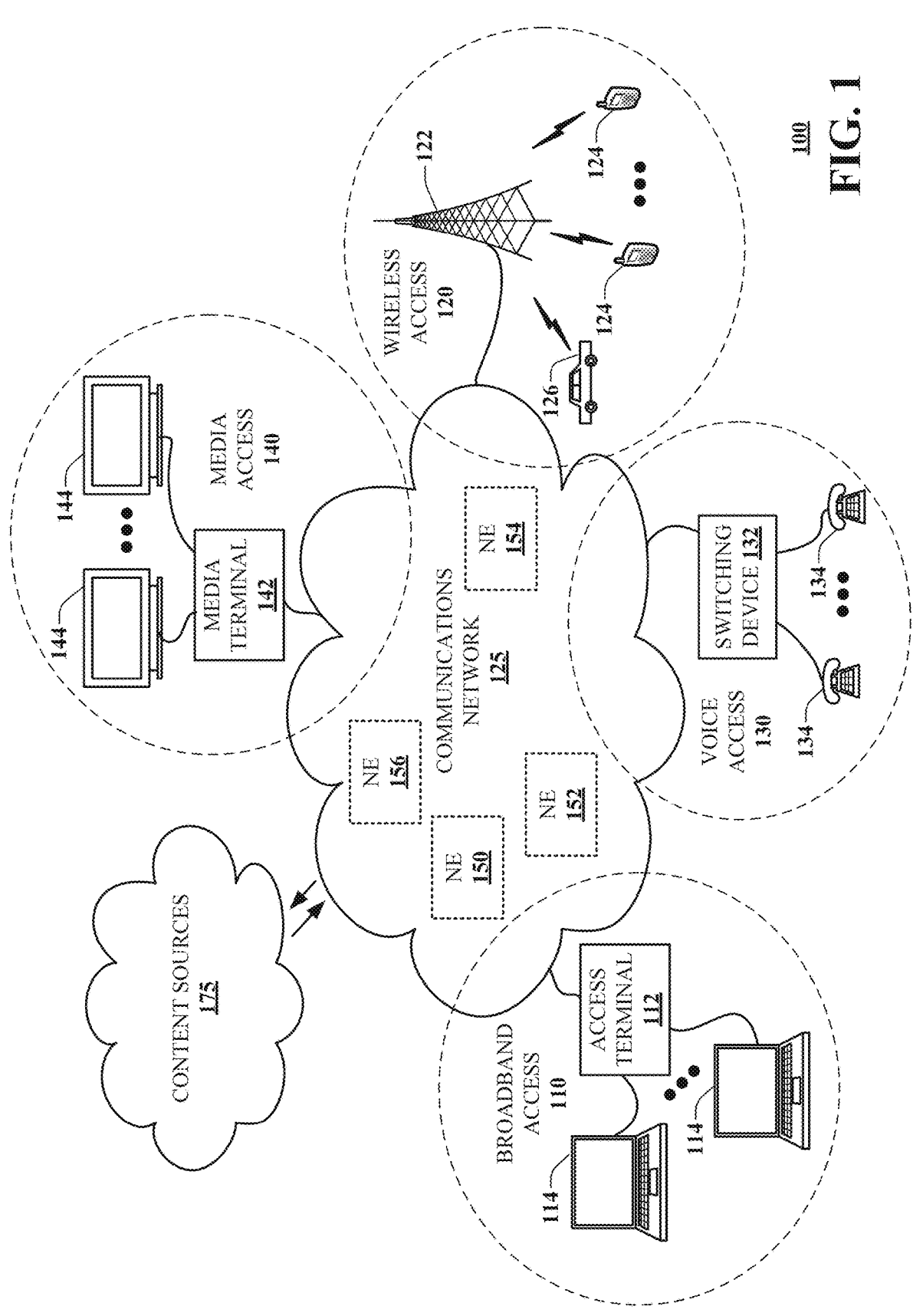
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part a system for detecting a non-terrestrial cell and managing Physical Cell ID (PCI) confusion/collision and Neighbor List integrity. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS)

modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
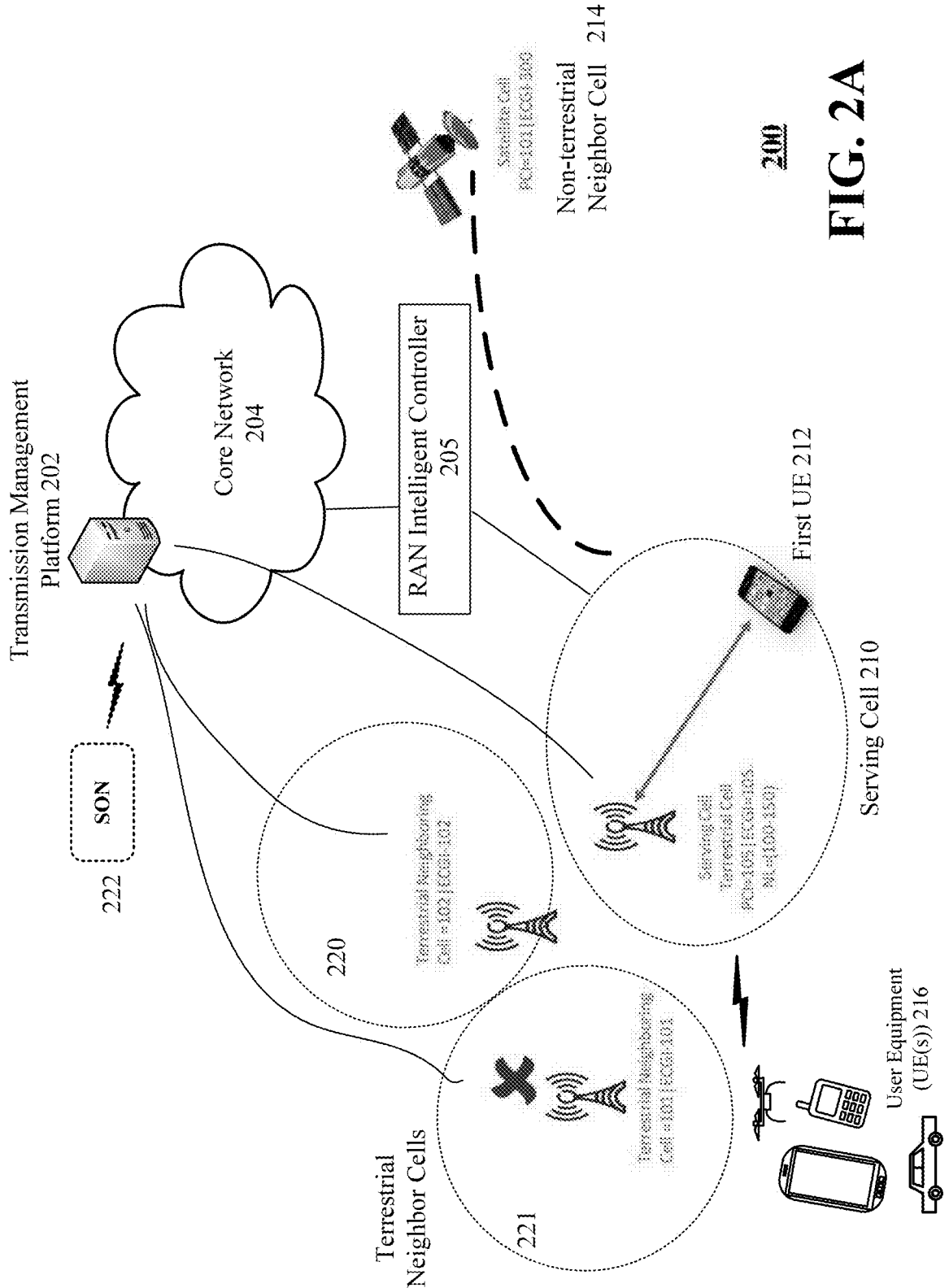
FIG. 2A is a block diagram illustrating an example, non-limiting embodiment of a system for detecting a non-terrestrial cell and managing Physical Cell Identity (PCI) confusion/collision and Neighbor List integrity functioning within the communication network of FIG. 1 in accordance with various aspects described herein.

FIG. 2A is a block diagram illustrating an example, non-limiting embodiment of a system 200 functioning within, or operatively overlaid upon, the communications network 100 of FIG. 1B in accordance with various aspects described herein. As shown in FIG. 2A, the system 200 may include a core network 204, one or more access networks 210, 218, 220, and one or more UEs 212 and 216. The system 200 implements detecting a non-terrestrial cell and managing Physical Cell Identity (PCI) confusion/collision and Neighbor List (NL) integrity in accordance with various aspects described herein.

The core network 204 may include network devices and/or systems that provide a variety of functions. In certain embodiments, the core network 204 may be implemented in a cloud architecture. Examples of functions provided by, or included, in the core network 204 include an access mobility function (AMF) configured to facilitate mobility management in a control plane of the network system 200 (including, for instance, providing UE mobility information associated with the access network(s) 210, 218, 220 and/or the UEs 212, 216 to the core network 204), a user plane function (UPF) configured to provide access to a data network, such as a packet data network (PDN), in a user (or data) plane of the network system 200, a Unified Data Management (UDM) function, a Session Management Function (SMF), a policy control function (PCF), and/or the like. The core network 204 may be in communication with one or more other networks (e.g., one or more content delivery networks (CDNs)), one or more services, and/or one or more devices. In one or more embodiments, the core network 204 may include one or more devices implementing other functions, such as a master user database server device for network access management, a PDN gateway server device for facilitating access to a PDN, and/or the like. The core network 204 may include various physical/virtual resources, including server devices, virtual environments, databases, and so on.

In various embodiments, access networks 210, 220, 221 may include a wireless radio access network (RAN). In exemplary embodiments, the access network 206 may be implemented in open source software (e.g., in an OpenAir-Interface (OAI) wireless technology platform). The access networks 210, 220, 221 may include network resources, such as one or more physical access resources and/or one or more virtual access resources. Physical access resources can include base station(s) (e.g., one or more eNodeBs (eNBs), one or more gNodeBs (gNBs), or the like, such as base stations), one or more satellites, one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as 4G/LTE, 5G, 6G, or any higher generation RAT. One or more edge computing devices (e.g., multi-access edge computing (MEC) devices or the like) may also be included in or associated with the access networks 210, 220, 221. Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access networks 210, 220, 221 may include any number/types of physical/virtual access resources and various types of heterogeneous cell configurations with various quantities of cells and/or types of cells.

In certain embodiments, the access networks 210, 220, 221 include, facilitate, support and operate with satellite cells. Satellite cells are capable of broadcasting information over wide areas and efficiently distributing content at the edge of cellular networks. Integration between terrestrial and satellite communications have been included in the 5G standard, and user equipment, communicating with terrestrial base stations, can also communicate satellites serving as wireless communication cells.

In certain embodiments, the access networks 210, 220, 221 include, facilitate, support and operate with high-altitude platform system (HAPS), aerial networks, compound networks known as vertical heterogeneous networks, etc. HAPS includes other forms of aerial networks which are networks of aerial stations that operate in the stratosphere at an altitude of around 17-20 km. Based on distinctive physical characteristics, HAPS can offer additional or efficient wireless services to users of terrestrial networks. Additionally, the access networks 210, 220, 221 may facilitate, support and operate with unmanned aerial vehicle (UAV) and tethered balloon (TB) networks.

In certain embodiments, the access networks 210, 220, 221 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. In some embodiments, the access networks 210, 220, 221 may include, or communicate with, a RAN intelligent controller (RIC).

In various embodiments, the RIC is a software-defined controller operating in the Open Radio Access Network (O-RAN) and configured to control RAN functions. The RIC includes a non-real-time (non-RT) part and a near-real-time (near-RT) part. The non-RT RIC is an element of the Service Management and Orchestration (SMO) Framework, as defined by the O-RAN Alliance. The non-RT RIC controls RAN elements and resources and runs applications such as rAPPs. The near-RT RIC runs applications such as xAPPs and communicates with the non-RT RIC to manage network optimization and policy guidance.

The system 200 can provide services to various types of UEs 212, 216. Examples of UEs 212, 226 include mobile devices, display and television devices, home and business networks, IoT devices, video and audio devices, autonomous vehicles, UAVs, and so on. UEs 212, 216 may be equipped with one or more transmitter (Tx) devices and/or one or more receiver (Rx) devices configured to communicate with, and utilize network resources of, the system 200. A UAV may include any (e.g., manually controllable or autonomous) personal or commercial aerial vehicle or device that is equipped with one or more types of devices or components for performing various actions. In certain embodiments, a UAV may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor(s), temperature sensor(s), chemical sensor(s), humidity sensor(s), and/or the like) for capturing information/data in an environment of the UAV, one or more mechanical limbs for physically manipulating external objects, and/or the like. In some embodiments, one or more UAVs may be deployed to provide network connectivity for other UE(s). In certain embodiments, a UAV may provide network connectivity by way of wireless "tethering" to (e.g., a base station or the like of) the access networks 210, 220, 221 or a different access network (i.e., one that is not experiencing a traffic surge condition) and/or via a wired link (e.g., over a fiber connection) to a network device (e.g., edge computing device or the like) that has a backhaul connection to the core network 204. A UAV may additionally, or alternatively, communicate data (e.g., control data, user data, etc.) via the wireless tethering or wired link.

In various embodiments, a transmission management platform 202 may be implemented in one or more devices included in the core network 204. For example, in a case where the core network 204 includes an evolved packet core (EPC), the transmission management platform 202 may include, or may be implemented in, a mobility management entity (MME) gateway, a serving gateway (SGW), or another EPC system or device. As another example, in a case where the core network 204 includes a 5G core (5GC), the transmission management platform 202 may include, or may be implemented in, an AMF or another 5GC system or device.

In various embodiments, the transmission management platform 202 may be implemented in a centralized network hub or node device at, or proximate to, an edge of a network provider's overall network. In some embodiments, the transmission management platform 202 can be implemented in a MEC device or devices. As the name/nomenclature implies, a MEC device may reside at a location that is at, or proximate, to an edge of the network system 200, which may be useful in reducing (e.g., minimizing) delays associated with provisioning of data or services to one or more (requesting) devices. In some embodiments, the transmission management platform 202 may additionally, or alternatively, be implemented in a Self-Organizing Network (SON) 222 or other similar network that provides automatic planning functions, configuration functions, optimization functions, diagnostic functions, and/or healing functions for a network. In some embodiments, the transmission management platform 202 may additionally, or alternatively, be implemented in a RIC or other similar device or device(s) that leverage data analytics and machine learning and/or artificial intelligence to provide resource management capabilities, such as mobility management, admission control, and interference management, at an edge of a network.

In exemplary embodiments, the transmission management platform 202 may be capable of determining the distribution of UEs in or across a geographic area according to their capabilities, location, and/or traffic type/requirements, and configuring one or more cells in the area for transmissions based on the determination. In various embodiments, the transmission management platform 202 may be configured to perform these functions in a 5G-NR network, a higher generation network, or a combination thereof.

The transmission management platform 202 may obtain data regarding UEs in a geographic area. The data for a UE may include, for instance, information regarding the type/capabilities of the UE (e.g., the UE's video processing capabilities, the UE's audio processing capabilities, the UE's wireless communications capabilities, etc.), information regarding the traffic type/requirements of the UE and/or its applications (e.g., URLLC requirements or other traffic-related or quality of service (QOS) parameters, such as those regarding transmission frequency, routing, the uplink/downlink, quality of service class identifier (QCI), and so on), information regarding the location of the UE (e.g., global positioning system (GPS) location, location determined based on signal strength information, and/or the like), or a combination thereof.

The UEs may be present in the area and may, as part of communicating with one or more network nodes of the access networks 210, 220, 221 provide some or all of the data to the network node(s). In various embodiments, the transmission management platform 202 may communicate with the network node(s) to obtain the data. For instance, the transmission management platform 202 may periodically poll the network nodes to obtain the data regarding the UEs. In certain embodiments, a network node may automatically provide the data of a UE to the transmission management platform 202 based on (e.g., prior to, upon, or after) attachment of the UE to the network node.

In some embodiments, as depicted in FIG. 2A, the access networks include a serving cell 210 and terrestrial neighbor cells 220, 221. The serving cell 210 is a terrestrial cell. The access networks further include one or more non-terrestrial cells 214 such as a satellite cell orbiting nearby. The serving cell 210 and the neighbor cells 220, 221 include one or more base stations as needed and support various types of UEs. In some embodiments, the serving cell 210 is in communication with a first UE 212. The first UE 212 may be stationary or move toward the neighbor cells 220, 221. The first UE

212 periodically and continuously detects and reports PCIs of neighbor cells to the serving cell 210. For instance, as depicted in FIG. 2A, the serving cell 210 is a terrestrial cell and has a PCI of 105. The neighboring terrestrial cells 220, 221 have PCI values of 101 and 102, respectively. The satellite cell 214 is orbiting above the first UE 212 and has a PCI of 101.

In various embodiments, the serving cell 210 has Automatic Neighbor Relation (ANR) functionalities enabled. The ANR is a self-optimization feature to dynamically build and maintain optimal neighbor lists for each cell in real time. The ANR automatically creates Neighbor Relation Table (NRT) for neighbor cells. ANR facilitates efficient neighbor management and enhances UE mobility among different cells. In some embodiments, the NRT is typically created for the first time by the self-organized network (SON) 222 as shown in FIG. 2A based on a distance (for example, an NRT of a given cell includes all the cells within 5 miles from the given cell). In various embodiments, the NRT is updated based on the ANR functionalities.

Figure 2B:
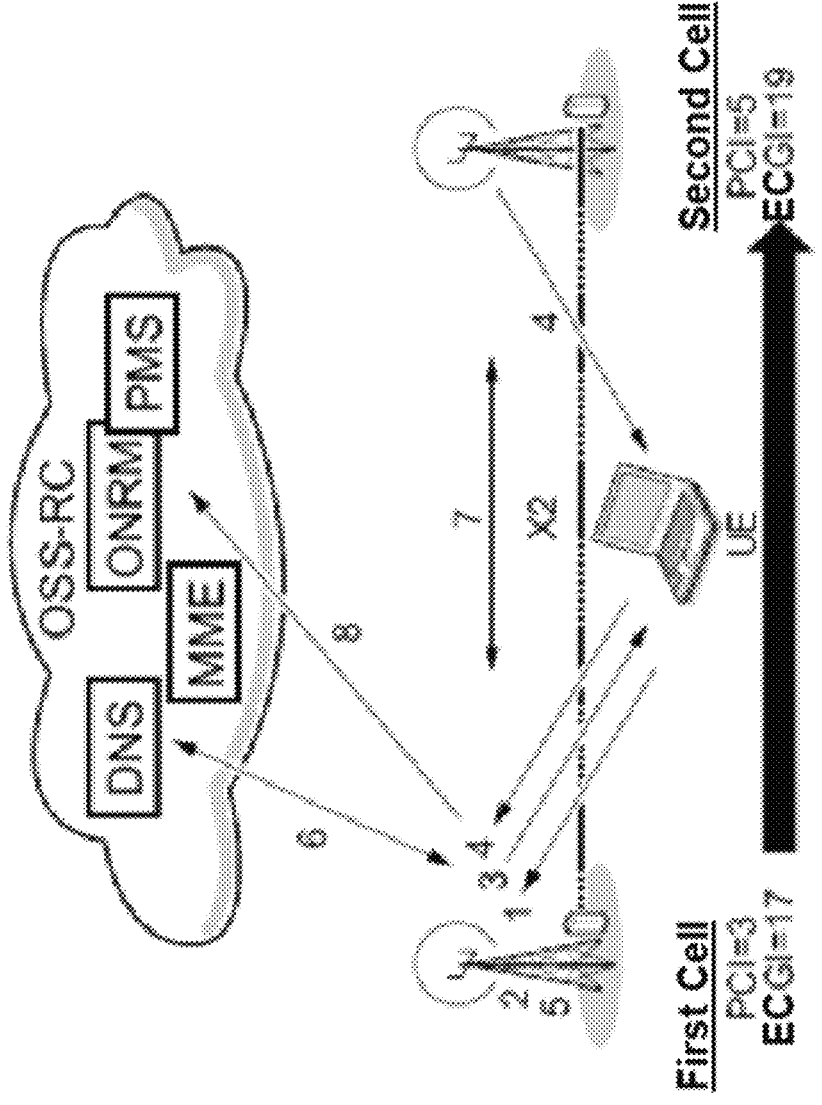
FIG. 2B depicts an Automatic Neighbor Relation process in accordance with various aspects described herein.

FIG. 2B illustrates an ANR process that updates the NRT in accordance with various aspects described herein. As shown in FIG. 2B, a first cell is an operating cell having a PCI value of 3 and an Evolved Universal Terrestrial Radio Access Network (EUTRAN) Cell Global ID (ECGI) value of 17 by way of example. PCIs can be reused throughout wireless networks as long as coverage of cells with identical PCIs do not overlap. To the contrary, ECGI is unique for each eNB throughout wireless networks having the same Public Land Mobile Network (PLMN). ECGI includes PLMN ID and Cell Global ID which includes an eNB ID and Cell ID. ECGI is used as a unique cell identifier across networks globally. ECGI is created based on Mobile Country Code (MCC), Mobile Network Code (MNC), an eNB-ID, and a Cell ID. Cells within the same PLMN have the same MCC and MNC. However, ECI, which is a combination of the eNB-ID and the Cell ID, is unique within the same PLMN.

In some embodiments, when a new eNB is established, the new eNB needs to select PCI values for all the cells (sectors) it supports. There are 504 unique PCI values in LTE, and 1008 PCI values in 5G, and the reuse of PCIs in different cells may be unavoidable. An eNB is expected to guarantee that confusion avoidance and collision avoidance are met when selecting PCI values. In selecting the PCI values, the eNB considers confusion avoidance, i.e., PCI of one cell should not be the same as those of neighbor cells and collision avoidance, i.e., PCI of the neighbor cells should not be the same. When the newly established eNB comes on air, the eNB has no knowledge of the PCI values of its neighboring eNBs. Self-PCI configuration procedures for a newly established eNB have not being defined in the standards.

More specifically, as depicted in FIG. 2B, the first cell operates a first eNB and a second cell operates a second eNB. In the ANR process, the first cell needs to have ECGI of the second cell in order to add and manage the second cell as a neighbor cell of the first cell. ECGI is used to set an X2 interface between cells, as further described below. The second cell, which may be newly established, has a PCI value of 5 and an ECGI value of 19. The UE detects the second cell and reports neighbor cell measurement to the first cell (Step 1). In this case, the UE may serve and function as a sensor to detect neighbor or nearby cells. The first cell determines that the PCI value of the second cell is unknown (Step 2) and instructs the UE to read the ECGI of the second cell (Step 3). The UE reads and reports the ECGI of 19 to the first cell (Step 4). The first cell determines that an IP address of ECGI=19 is not known (Step 5). The first cell requests the IP address of ECGI=19 to Domain Name Server (DNS) of a mobile core system (Step 6). The first cell receives an IP address of the second cell from the mobile core system via Mobile Management Entity (MME)/DNS (Step 6). Based on the ECGI and the IP address, the first cell establishes an X2 interface (Step 7). The first cell then updates an Element Management System (EMS) (step 8). In some embodiments, the EMS includes systems and applications for managing network elements on a network element-management layer of the Telecommunications Management Network Model.

The first cell adds the second cell to a Neighbor Relation Table (NRT) thereof. As the UE moves toward a coverage area of the second cell, a handover takes place accordingly. Additionally, if there is no handover to a neighboring cell for a long or configurable period of time, then the first cell may delete a neighbor cell entry from the NRT. Once the ANR process or mechanism is completed, source and target eNBs, share their corresponding NRTs via the X2 interface, including PCIs and frequency in use, and the PCIs and the frequency in use are added to the NRT of source and target eNBs. Although one eNB is illustrated in the first cell and the second cell in FIG. 2B, two or more eNB may be available in each cell based on various factors. The ANR process or mechanism is explained with eNBs but it is not limited thereto.

The ANR process or mechanism described in connection with FIG. 2B involves terrestrial neighboring cells. Referring back to FIG. 2A, the first user equipment (UE) 212 is operating within the serving cell 210. Two terrestrial neighboring cells 220, 221 are present nearby. When the first UE 212, operating like a sensing system, discovers terrestrial neighbor cells 220, 221, the first UE 212 reports to the serving cell 210 which adds neighbor cells entries to the NRT thereof, as described above in conjunction with FIG. 2B. In some embodiments, the serving cell 210 may detect a PCI confusion by identifying PCI duplications in its NRT. Once the PCI confusion is detected, it can be resolved by updating one of PCI values. For instance, the PCI values of the neighbor cells 220, 221 may be identical and the PCI confusion is detected by the serving cell 210. Then the serving cell 210 may update a PCI value of the neighbor cell 221 to be different from a PCI value of the neighbor cell 220.

In some embodiments, the ANR process or mechanism may involve non-terrestrial neighbor cells. A Cellular Service Provider (CSP) with a terrestrial cellular network (TN) may own a direct cellular-to-satellite non-terrestrial network in addition to the terrestrial network. Cellular-to-satellite non-terrestrial network (NTN) can create a direct connection from a customer's/subscriber's garden variety cellular telephones using LTE, 5G, GSM, UMTS, 6G, or other commercially-available cellular technology to a satellite. The satellite must use frequency bands that UEs are already designed to communicate with, and must use either unlicensed bands or bands that are licensed to the CSP.

In various embodiments, satellite cells may be used to provide additional coverage or capacity to terrestrial cells. Satellite cells may have the ability to use one or more cells and operate at different frequency bands (i.e. B5 (850 MHz), B14 (700 MHz)). Wireless operator may have the ability to mandate satellite cells to change frequency bands to avoid interference with terrestrial cells, which may operate in the same frequency band.

In some embodiments, cellular service providers can use satellite cells to provide additional service capacity to specific areas at specific hours of the day (e.g., busy hour). Also, cellular service providers may have the ability to change the trajectory of the satellite cells or schedule the trajectory of the satellite cells, in such a way that satellite cells orbit over the congested terrestrial RAN areas at their corresponding busy times. Cellular service providers are aware of the time and duration the satellite cells will cover the congested areas. Cellular service providers are also aware of the frequency bands used in the terrestrial cells, and it is also aware of the phone capabilities and bands that they support. Cellular service providers may use different frequency bands in different locations.

In other embodiments, cellular service providers can use satellite cells to provide service capacity to remote areas where terrestrial cells may not be able to reach or readily available and/or difficult to be established and maintained. Cellular service providers may change the trajectory of the satellite cells or schedule the trajectory of the satellite cells to provide cellular services.

Referring back to FIG. 2A, a satellite cell 214 may orbit above the first UE 212 which can detect the satellite cell 214 and report to the serving cell 210. As discussed above in connection with FIGS. 2A and 2B. LTE/5G networks use the ANR process or mechanism to dynamically build and maintain optimal neighbor lists for each cell in real time. UEs are used to detect and report neighboring cells to the serving cell. The satellite cell 214 is detected by the first UE 212 where a detected PCI is "101." In some embodiments, the detected PCI of the satellite cell 214 is identical to the PCI of the neighbor cell 221. In other embodiments, the detected PCT of the satellite cell 214 may be unknown. In either situation, the serving cell 210 requests the first UE 212 to read and provide ECGI of the satellite cell 214 in order to further verify an identification of the satellite cell 214. The serving cell 210 will operate to resolve the PCI confusion of "101" and avoid a neighbor list corruption.

As depicted in FIG. 2A, the self-organized network (SON) 222 searches all used PCI values in the area. The SON 222 will then assign an unused PCI to the newly established eNB. If PCI collision/confusion is detected, the SON 222 re-assign and replace a new PCI to this eNB to avoid conflict. This approach may take several rounds of a trial and error, and during this time, handover performance from/to this eNB may be impacted (e.g., handover-failure, Ping-Pong).

As the detected satellite cell 214 has the same PCI as that of the neighbor cell 221, PCI collision/confusion and Neighboring List (NL) issues may arise in the network where the system 200 operates. For instance, the network is a heterogeneous terrestrial and satellite 5G Networks, and the ANR functionality is enabled in the Terrestrial RAN. The PCI collision/confusion and the NL issue may yield handover failure. The conventional ANR functionalities may not be able to distinguish terrestrial cell against satellite cells or vice versa. Identifying a cell type, more specifically, a non-terrestrial cell type, and notifying the serving cell 210 with a corresponding flag, can be used to avoid the PCI collision/confusion and NL corruption.

In various embodiments, identification of the non-terrestrial cell type can be based on a signature or a pattern or a behavior of the non-terrestrial cell type which are clearly different from a terrestrial cell type and signifies the non-terrestrial cell type. For instance, a satellite cell, which is a non-terrestrial cell, orbits at a much faster speed and at a higher altitude. Additionally, the satellite cell covers a wider range of area than that of a terrestrial cell. In some embodiments, signal power detected from the satellite cell may present different patterns based on the movement of the satellite cell. As another example, the network of satellite cells may use a different Mobile Country Code/Mobile Network Code (MCC/MNC) combination so that each satellite cell is clearly differentiated from each cell in the terrestrial network. Additionally, Low-Earth-Orbit (LEO) satellite cells may exhibit a rapidly changing center frequency due to the changing doppler effect as the satellite rises and falls. The round-trip latency time of data to and from the satellite cell may also be perceived to change as the satellite moves from the horizon, across the highest point of elevation, and the sets at the opposite horizon.

Figure 2C:
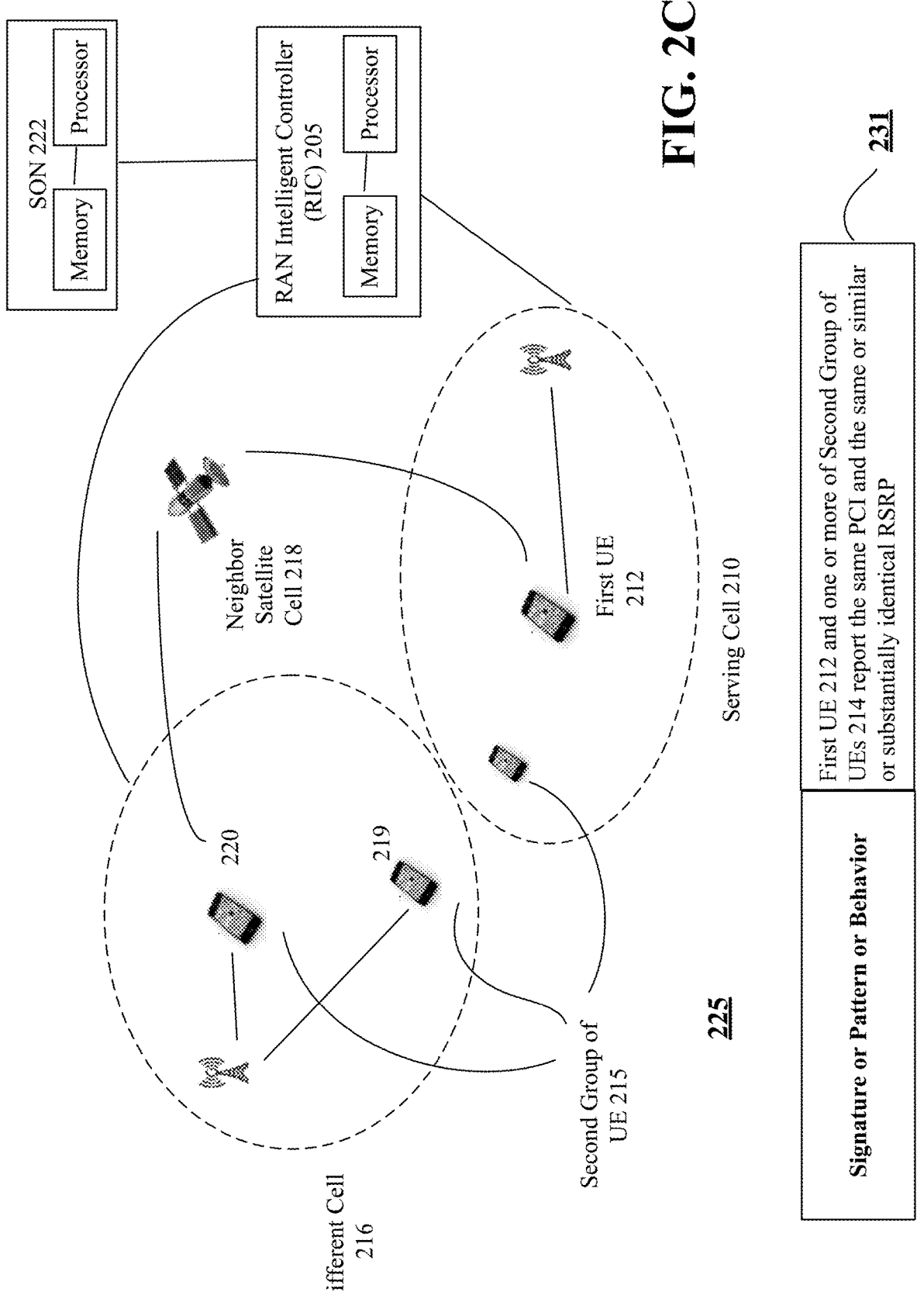
FIG. 2C depicts an example, non-limiting embodiment of detecting a non-terrestrial neighbor cell based on a signature or a pattern or a behavior of the non-terrestrial neighbor cell in accordance with various aspects described herein.

FIG. 2C depicts an example, non-limiting embodiment of a system 225 for detecting a non-terrestrial neighbor cell based on a signature or a pattern or a behavior recognized as and relevant to a non-terrestrial neighbor cell in accordance with various aspects described herein. In the system 225, the non-terrestrial neighbor cell is a satellite cell 218, but the present disclosure is not limited thereto and other forms of non-terrestrial cells such as UAV cells, drones, a high altitude platform system cells, can be detected. The system 225 determines the satellite cell as a non-terrestrial cell, based on the same PCI and the substantially same physical property detected by different UEs spaced apart (231).

In some embodiments, the satellite cell 218 orbits over a wide area. As described above in connection with FIG. 2B, the first UE 212 detects the satellite cell 218 orbiting above the first UE 212. The first UE 212 reports a PCI of the neighbor cell 218 to the serving cell 210. In addition, the first UE 212 further detects and report a Reference Signal Received Power (RSRP) of the satellite cell 218. The RSRP is defined as the linear average over the power contributions of resource elements that carry cell-specific reference signals within the considered measurement frequency bandwidth. A Reference Signal is a special signal placed at a predefined position and a position of the Reference Signal may vary based on a PCI value. To perform attachment of UEs, call selection/deselection, handover procedures, etc., the RSRP is calculated per each eNB signal available at a selected location. Based on the RSRP, an eNB having the best channel quality may be selected to support UEs. A RSRP unit is dBm, and UEs do not report RSRP values (negative values in dBm) but report an integer value between 0 and 97.

In various embodiments, UEs continuously monitor signals transmitted by nearby cell towers such that UEs can be connected to a cell tower that provides the best signal. Cellular technology includes reference signals which provide information to UEs for evaluating the state of connection to a given cell tower in a standard way.

In some embodiments, the system 225 detects a non-terrestrial type of the neighbor cell 218 based on a signature or a pattern or a behavior of such cell. As depicted in FIG. 2C, the first UE 212 detects the neighbor cell 218 and report a PCI and a RSRP value to the serving cell 210. In addition, the first UE 212 provides a location thereof to the serving cell 210. In some embodiments, a correlation of the PCI, the RSRP value, and the location of the first UE 212 with respect to the neighbor cell 218 and all other detected cells are stored in the form of a correlation table in a database. The database may be stored in a memory which resides in eNBs located in the serving cell 210 and the different cell 216, the RIC 205, the SON 222, the transmission management system 202, the core network 204, or any combination thereof. Additionally, the correlation table may store a probability of a non-terrestrial cell based on the correlation of the PCI, the RSRP and the location of the first UE 212. For instance, a probability of a non-terrestrial cell may be lower when the same PCI and substantially identical RSRP are detected by two UEs closely located. The correlation table may be evaluated, tested, or modified based on past data, sample/test data, and/or real time data. In other embodiments, the correlation information may not be limited to the non-terrestrial cell type and is applicable to terrestrial cells in the network. Additionally, the correlation information may be obtained from other UEs operating in the serving cell 210 and other cells.

In some embodiments, a terrestrial neighbor cell 216 is present adjacent to the serving cell 210. A group of second UEs 215 operates either in the serving cell 210, the different cell 216 or both. As the neighbor cell 218 moves at a fast speed over a larger area, the group of second UEs 215 may detect the neighbor cell 218 and report the PCI, the RSRP value, and location(s) of the group of second UEs 215 to the serving cell. If one or more of the group of second UEs 215 may be present in the serving cell 210, then a distance between the group of second UEs 215 and the first UE 212 may be farther than a predetermined distance at the time of detecting the neighbor cell 218. In some embodiments, the predetermined distance may be selected in light of a moving speed of a non-terrestrial cell such as a satellite. Additionally, or alternatively, the group of second UEs 215 may be present in the different cell 216 and distanced apart from the first UE 212. In other embodiments, the detection of the neighbor cell 218 detected by UEs that are located nearby may be discarded or not considered in light of the locations of such UEs.

In some embodiments, one or more of a group of second UEs 215 may substantially simultaneously detect the satellite cell 218 and report the same PCI and the same or similar RSRP to the serving cell 210 or the different cell 216. The serving cell 210 or the different cell 216 reports this information to the RIC 205, the SON 222, the transmission management platform 202, etc. As depicted in FIG. 2C, the RIC 205 includes a processor and a memory for storing executable instructions that facilitate operations. In some embodiments, the operations include receiving information relating to a detected cell, determining a cell type, such as a non-terrestrial satellite cell, and managing a neighbor list and avoiding neighbor list corruption, as will be explained in detail below in connection with FIGS. 2F through 2H. The one or more of the group of second UEs 215 may reside in the serving cell 210, a different cell 216 or both. When the one or more of the group of second UEs 215 resides in the serving cell 210, then a distance between the first UE 212 and the one or more of the group of second UEs 215 is farther than a predetermined distance which indicates a cell type to be not terrestrial. In some embodiments, the predetermined distance may be pre-set and stored in relevant network elements such as an eNB, the RIC 205, the SON 228, at the mobile core network 204, or a combination thereof.

As shown 231 in FIG. 2C, the detection of a neighbor cell having the same PCI and substantially identical RSRP, by two or more sufficiently distanced UEs beyond a predetermined threshold distance, indicates that the detected neighbor cell orbits a wide area with fast speed. Such movement indicates a signature or a pattern or a behavior which signifies a non-terrestrial cell type rather than a terrestrial cell. In various embodiments, an orbiting speed of a satellite cell is obtained and evaluated with respect to a distance and locations of UEs which detect the satellite cell. The network elements such as the serving cell 210, the different cell 216, the RIC 205, the SON 208, or the mobile core network 204 store relevant database relating to satellite cells and the correlation among the PCI, the RSRP and locations of one or more UEs and algorithms that detect satellite cells and manage the neighbor list of the serving cell 210 or the different cell 216.

In some embodiments, relevant data are collected and evaluated to determine confidence values or probability values to the determination that a detected neighbor cell is a non-terrestrial type and/or a particular type of the non-terrestrial type such as a satellite. In some embodiments, an artificial intelligence model using machine learning techniques may be used to make more reliable determinations. Sample data set may be prepared and used to train algorithms stored in the network elements in order to improve reliability and accuracy in the determination of non-terrestrial cells. In some embodiments, real data detected from satellite cells or other non-terrestrial cells can be used to train the artificial intelligence model. Once the system 225 is put to use and makes determinations, such determinations can be used as another test data set for training the artificial intelligence model.

In some embodiments, one or more of various network elements may include relevant algorithms for performing a cell type determination. By way of example, the relevant algorithms can reside at the mobile core network, the radio access network or behind an eNB, i.e., the SON 208 and the RIC 205. Additionally, or alternatively, the relevant algorithms may reside at one or more network elements as needed to improve efficiency and reliability of the cell type determination by the system 225.

Figure 2D:
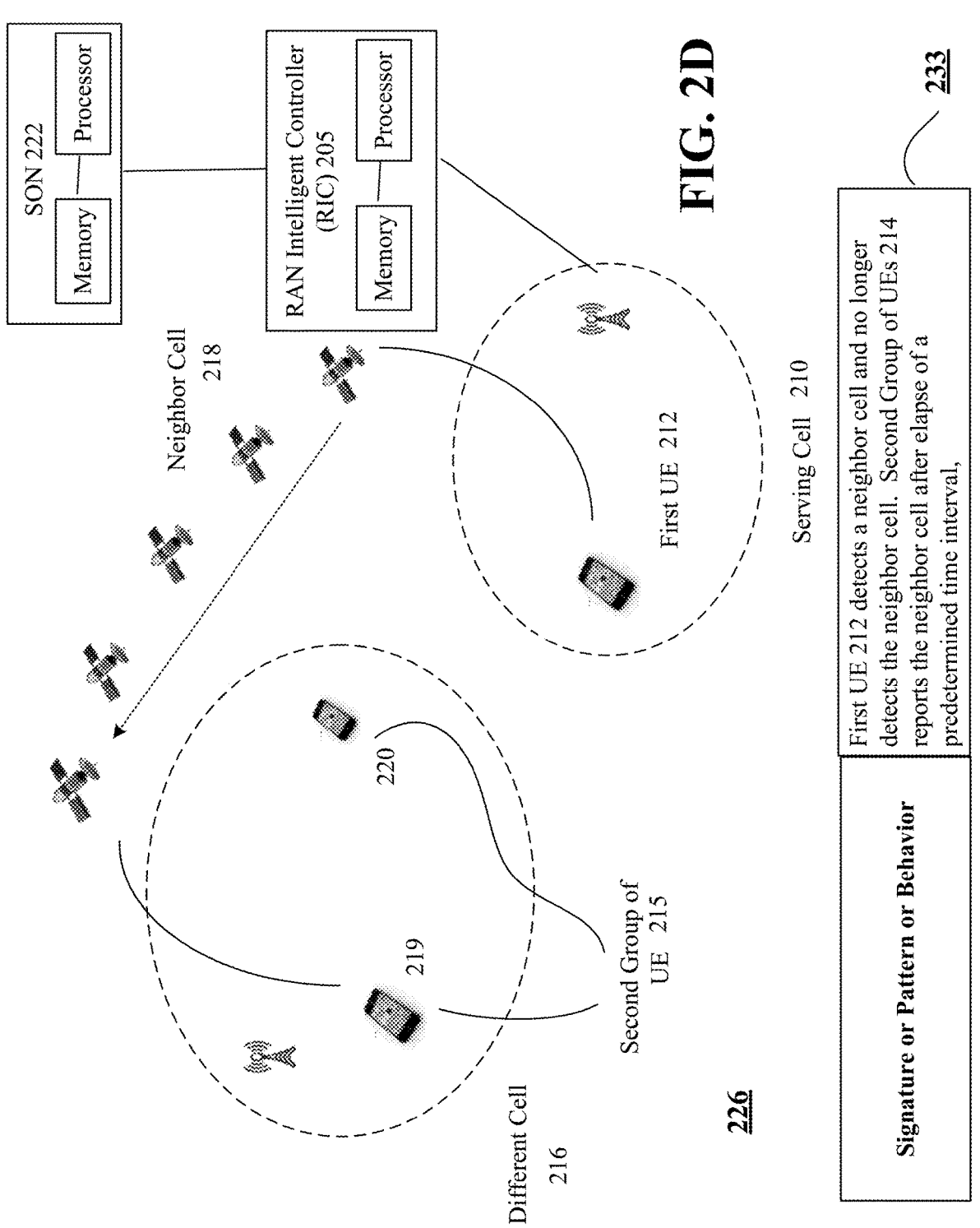
FIG. 2D depicts another example, non-limiting embodiment of detecting a non-terrestrial neighbor cell based on another signature or pattern or behavior of the non-terrestrial neighbor cell in accordance with various aspects described herein.

FIG. 2D depicts an example, non-limiting embodiment of a system 226 for detecting a non-terrestrial neighbor cell based on another signature or pattern or behavior recognized as and relevant to a non-terrestrial neighbor cell in accordance with various aspects described herein. The system 226 detects a satellite cell based on a signature or a pattern or a behavior relevant to the satellite cell (233). The system 226 detects the satellite cell based on fast moving speed detected by different UEs operating in different cells after elapse of a predetermined time interval (233 in FIG. 2D). However, the present disclosure is not limited thereto.

As depicted in FIG. 2D, the first UE 212 operating in the serving cell 210 and detects the neighbor cell 218. The first UE 212 reports the PCI and the RSRP of the neighbor cell 218. Then the first UE 212 reports no detection of the neighbor cell 218 within a predetermined time period. Subsequently, the neighbor cell 218 is detected by one or more of the group of second UEs 215. The one or more of the group of second UEs 215 are positioned at a distance beyond a predetermined threshold from the location of the first UE 212.

The detection of a neighbor cell 218, followed by the discontinued detection of the neighbor cell 218 at the first UE 212, indicates that the detected neighbor cell has moved to the different cell 216 from the serving cell 210 at a fast speed. Such a movement pattern or behavior signifies a non-terrestrial cell type rather than a terrestrial cell. The substantially simultaneous detection of the satellite cell by the one or more of the group of second UEs 215 confirms that the neighbor cell has moved to the different cell 216. In various embodiments, an orbiting speed of a satellite cell is obtained and evaluated with respect to a distance between and locations of UEs which can be used with algorithms for detecting non-terrestrial algorithms. The network elements such as the serving cell 210, the different cell 216, the RIC 205, the SON 208, or the mobile core network 204 as shown in FIGS. 2A and 2C, store relevant data relating to satellite cells and correlate the PCI, the RSRP and locations of one or more UEs. Based on the correlation, the network elements reach a determination that the neighbor cell type is a satellite cell.

Figure 2E:
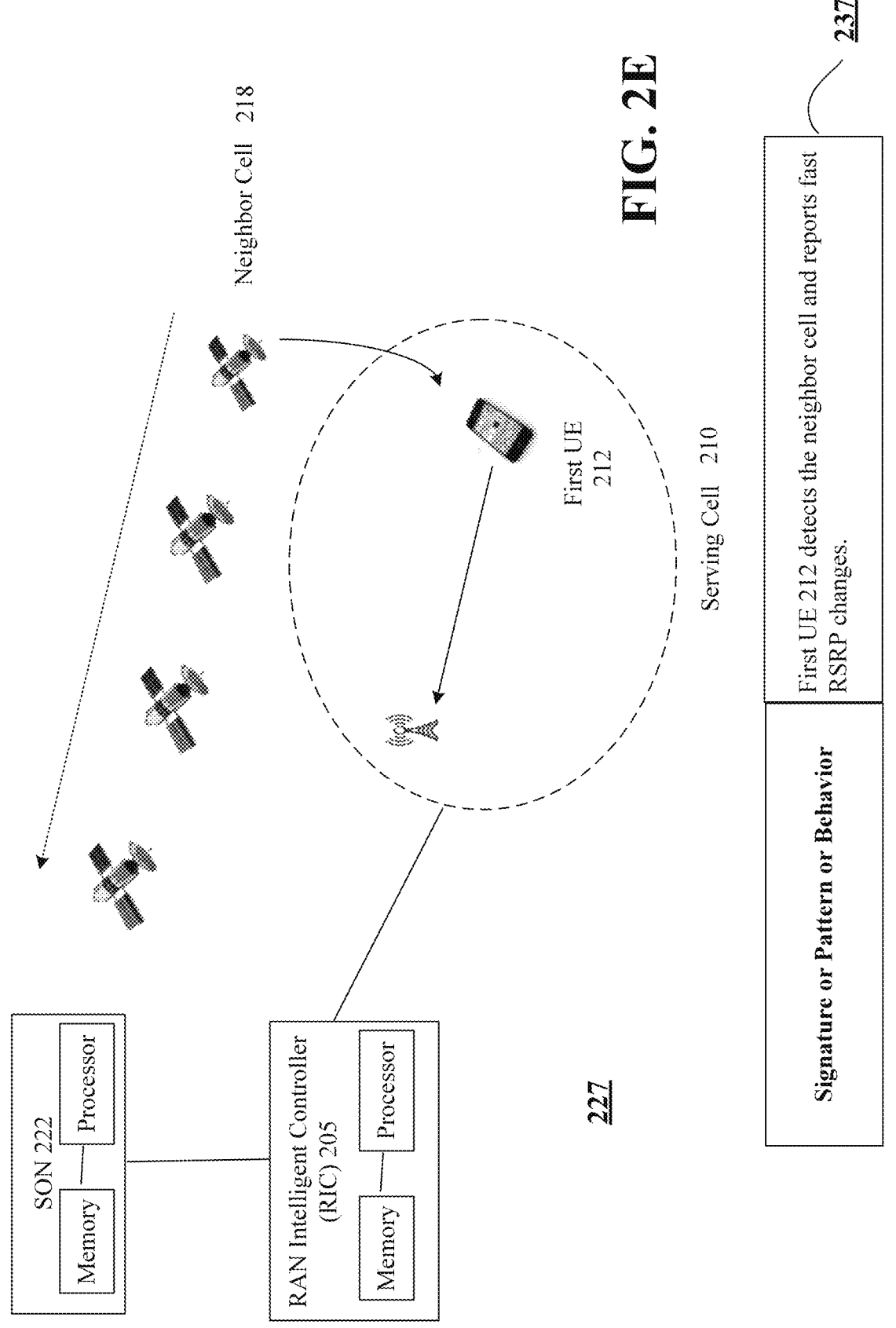
FIG. 2E depicts further another example, non-limiting embodiment of detecting a non-terrestrial neighbor cell based on further another signature or pattern or behavior of the non-terrestrial neighbor cell in accordance with various aspects described herein.

FIG. 2E depicts an example, non-limiting embodiment of a system 227 for detecting a non-terrestrial neighbor cell based on further another signature or pattern or behavior recognized as and relevant to a non-terrestrial neighbor cell in accordance with various aspects described herein. The system 227 detects a satellite cell based on a signature or a pattern or a behavior relevant to the satellite cell which are rapid changes in detected RSRP by a stationary UE (237 as shown in FIG. 2E).

As depicted in FIG. 2E, the first UE 212 operating in the serving cell 210 and detects the neighbor cell 218. The first UE 212 reports the PCI and the RSRP of the neighbor cell 218. The first UE 212 has zero mobility and remains stationary. The first UE 212 detects and reports that the RSRP of the neighbor cell 218 rapidly changes. For example, the first UE 212 detects that the RSRP of the neighbor cell 218 rapidly decreases.

The detection of rapid change of the RSRP of the neighbor cell, at the first UE 212 having zero mobility, indicates that the detected neighbor cell has moved with fast speed. Such a movement pattern or behavior signifies a non-terrestrial cell type rather than a terrestrial cell. In various embodiments, an orbiting speed of a satellite cell is obtained and evaluated with respect to a distance between and locations of UEs which can be used with algorithms for detecting non-terrestrial algorithms. The network elements such as the serving cell 210, the different cell 216, the RIC 205, the SON 208, or the mobile core network 204, as shown in FIG. 2E, store relevant data relating to satellite cells and correlate the PCI, the RSRP and locations of one or more UEs. Based on the correlation, the network elements reach a determination that the neighbor cell type is a satellite cell.

FIG. 2F depicts one illustrative embodiment of a method in accordance with various aspects described herein. In various embodiments, the method 250 includes receiving first neighbor cell information from a first user equipment (UE) operating in a first terrestrial service cell (at 252). In various embodiments, the first neighbor cell information includes a first physical cell identity (PCI) of a first neighbor cell and a cell type indicator detected by the first user equipment. In one or more embodiments, the cell type indicator include Reference Signal Received Power (RSRP) of the first neighbor cell, as depicted in FIGS. 2C through 2E.

In some embodiments, the method 250 further includes generating a database that cross-references the first PCI, the cell type indicator and a location of the first UE (at 253). The method further includes analyzing a correlation among the first PCI, the cell type indicator and the location of the first UE to identify anomalies indicative of a non-terrestrial neighbor cell (at 254). For instance, the analyzing the correlation includes determining whether the cell type indicator represents a rapid decrease of the RSRP within a predetermined time from a detection time point of the RSRP and whether, during the predetermined time, the location of the first UE remains unchanged, as depicted 233 in FIG. 2E.

As another example, the method includes receiving the first PCI of the first neighbor cell from a group of second user equipment (UE), where one of the group of second user equipment operates in the first terrestrial service cell or a different cell from the first terrestrial service cell, as depicted in FIG. 2C. In some embodiments, the analyzing the correlation further includes, with respect to the first neighbor cell, determining whether a RSRP received from the one of the group of second UE is substantially identical to a RSRP received from the first UE, and determining whether a location of the one of the group of second UE is distant from the location of the first UE beyond a predetermined threshold (231 in FIG. 2C). In other embodiments, the analyzing the correlation further includes determining whether the first UE has sent a measurement report of the RSRP and subsequently discontinues to send the RSRP during a predetermined time frame and determining whether group of second UEs reports detection of the RSRP (as depicted 233 in FIG. 2D).

The method includes that upon the identification of the anomalies, requesting the first UE to read and report EUTRAN Cell Global Identifier (ECGI) of the first neighbor cell (at 255). Based on the ECGI, requesting the first terrestrial service cell not to add the first neighbor cell to a neighbor list (at 256). Additionally, the method further includes performing no handover from the first terrestrial service cell to the first neighbor cell in case that a handover is not allowed to the first neighbor cell which is determined to be a non-terrestrial cell. Additionally or alternatively, the method further includes mandating the first terrestrial service cell to discard a neighboring list entry that corresponds to the non-terrestrial cell type. In other embodiments, the method includes mandating the first terrestrial service cell to flag a neighboring list entry that corresponds to the non-terrestrial cell type without discarding the neighboring list.

In various embodiments, the method further includes generating a global database registry of unique cell identification for the non-terrestrial cell, and the non-terrestrial cell further comprises a satellite cell, an unmanned aerial vehicle, a tethered balloon, a high-altitude platform system, etc.

FIG. 2G depicts another illustrative embodiment of a method in accordance with various aspects described herein. In various embodiments, the method 260 includes receiving a first physical cell identity (PCI) of a first neighbor cell from a first user equipment (UE) operating in a first terrestrial service cell (at 261) and upon determination that the first PCI is unknown, requesting the first UE to read and report extended first neighbor cell information (at 262). By way of example, the extended first neighbor cell information includes ECGI of the first neighbor cell which carries unique information. The ECGI of the first neighbor cell is required to establish an X2 interface between the first terrestrial service cell and the first neighbor cell. The method 260 further includes obtaining an IP address of the first neighbor cell from a mobile core network (at 263), as depicted in FIGS. 2A-2B.

In some embodiments, the method 260 also includes receiving information of a second neighbor cell from a group of second user equipment (UE), where the second neighbor cell information includes a second physical cell identity (PCI) and cell type information. In one or more embodiments, the cell type information is indicative of a signature or a pattern or a behavior of a non-terrestrial cell (at 264). The method 260 includes, upon detection of the cell type information, requesting the group of second UE to read and report extended second neighbor cell information (at 265).

In various embodiments, the method 260 further includes determining that the received cell type information represents anomalies that are unobtainable from a terrestrial cell type. For example, the anomalies include detecting the second PCI and a signal strength within a predetermined range by two or more of the group of second UE that are spaced apart, as depicted in 231 of FIG. 2C. As another example, the anomalies include detecting the second PCI and a substantially identical signal strength by the first UE, and/or the group of second UE with a predetermined time interval as depicted in 233 of FIG. 2D. As further another example, the anomalies include detecting the second PCI and a signal strength that changes rapidly from a detection time point by one of the group of second UE, where the one of the group of second UE having zero mobility detects the rapidly changed signal strength, as depicted in 237 of FIG. 2E.

In various embodiments, the method 260 further includes performing a handover from the first terrestrial service cell to the first neighbor cell based on a movement of the first UE. The method 260, however, includes performing no handover from the first terrestrial service cell to the second neighbor cell based on the determination that the second neighbor cell is a non-terrestrial cell such as a satellite cell.

Additionally or alternatively, the method 260 includes requesting the first terrestrial service cell to add a neighboring list entry of the first neighbor cell to a neighbor list (NL) and forgo to add a neighboring list entry of the second neighbor cell to the neighbor list (at 266).

FIG. 2H depicts further another illustrative embodiment of a method in accordance with various aspects described herein. The method 270 includes receiving, by a processing system including a processor, a first physical cell identity (PCI) of a neighbor cell from a first user equipment (UE) (at 272) and receiving, by the processing system, additional neighbor cell information (at 274). In some embodiments, the additional neighbor cell information includes Reference Signal Received Power (RSRP) of the neighbor cell. The method further includes determining, by the processing system, whether the first PCI is unidentifiable or unknown (at 276). The method includes analyzing, by the processing system, a correlation among the first PCI, the additional cell information and a location of the first UE to recognize a signature or a pattern or a behavior of the neighbor cell (at 278). For instance, the analysis is performed with respect to whether the neighbor cell having the first PCI has been detected by multiple UEs spaced apart from each other (231 in FIG. 2C), the RSRP rapidly changes despite a stationary position of UEs (237 in FIG. 2E), the neighbor cell is no longer detected, etc. (233 in FIG. 2D). Such analysis results in certain signature or pattern or behavior of the neighbor cell which signifies or indicates a non-terrestrial cell such as a satellite cell.

The method includes requesting EUTRAN Cell Global Identifier (ECGI) of the neighbor cell and receiving from the first UE (at 280), and based on the ECGI and the recognized signature or pattern or behavior of the neighbor cell, determining that the neighbor cell is a non-terrestrial cell (at 282). By way of example of the recognized signature or pattern or behavior of the non-terrestrial cell, the network of satellite cells may use a different Mobile Country Code/Mobile Network Code (MCC/MNC) combination so that each satellite cell is clearly differentiated from each cell in the terrestrial network. Additionally, Low-Earth-Orbit (LEO) satellite cells may exhibit a rapidly changing center frequency due to the changing doppler effect as the satellite rises and falls. The round-trip latency time of data to and from the satellite cell may also be perceived to change as the as the satellite moves from the horizon, across the highest point of elevation, and the sets at the opposite horizon.

Upon the determination that the neighbor cell is the non-terrestrial cell, the method 270 further includes performing, by the processing system, no handover to the neighbor cell from a current service cell. In addition, upon the determination that the neighbor cell is the non-terrestrial cell, the method 270 further includes mandating a service cell of the first UE, by the processing system, to discard a neighbor list entry corresponding to the neighbor cell.

Additionally, or alternatively, upon the determination that the neighbor cell is the non-terrestrial cell, a service cell of the first UE, by the processing system, is mandated to flag a neighbor list entry corresponding to the neighbor cell as the non-terrestrial cell without discarding the neighbor list entry.

The method 270 further includes generating a global database registry of unique cell identifications for non-terrestrial cells which include the ECGI of the neighbor cell.

While for purposes of simplicity of explanation, the respective processes are shown and described as a series of blocks in FIG. 2F through FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part a system for detecting a non-terrestrial cell and managing Physical Cell ID (PCI) confusion and Neighbor List integrity.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a system for detecting a non-terrestrial cell and managing Physical Cell ID (PCI) confusion and Neighbor List integrity.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a system for detecting a non-terrestrial cell and managing Physical Cell ID (PCI) confusion and Neighbor List integrity. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CSbased traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a system for detecting a non-terrestrial cell and managing Physical Cell ID (PCI) confusion and Neighbor List integrity.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X. UMTS/HSDPA, GSM/

GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x = (x_1, x_2, x_3, x_4 \ldots x_n)$, to a confidence that the input belongs to a class, that is, f (x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving first neighbor cell information from a first user equipment (UE) operating in a first terrestrial service cell, wherein the first neighbor cell information includes a first physical cell identity (PCI) of a first neighbor cell and a cell type indicator detected by the first UE;

generating a database that cross-references the first PCI, the cell type indicator and a location of the first UE;

analyzing a correlation among the first PCI, the cell type indicator and the location of the first UE to identify anomalies indicative of a non-terrestrial neighbor cell;

upon the identification of the anomalies, requesting the first UE to read and report an Evolved Universal Terrestrial Radio Access Network (EUTRAN) Cell Global ID (ECGI) of the first neighbor cell; and based on the ECGI, requesting the first terrestrial service cell not to add the first neighbor cell to a neighbor list.

2. The device of claim 1, wherein the operations further comprise performing no handover from the first terrestrial service cell to the first neighbor cell.

3. The device of claim 1, wherein the operations further comprise mandating the first terrestrial service cell to discard a neighboring list entry that corresponds to the non-terrestrial cell type.

4. The device of claim 1, wherein the operations further comprise mandating the first terrestrial service cell to flag a neighboring list entry that corresponds to the non-terrestrial cell type without discarding the neighboring list entry.

5. The device of claim 1, wherein the analyzing the correlation further comprises:

determining whether the cell type indicator represents a rapid decrease of a Reference Signal Received Power (RSRP) within a predetermined time from a detection time point of the RSRP by the first UE and whether, during the predetermined time, the location of the first UE remains unchanged.

6. The device of claim 1, wherein the operations further comprise receiving the first PCI of the first neighbor cell from a group of second user equipment (UE), wherein one of the group of second UE operates in the first terrestrial service cell or a different cell from the first terrestrial service cell.

7. The device of claim 6, wherein the analyzing the correlation further comprises:

with respect to the first neighbor cell, determining whether a RSRP received from the one of the group of second UE is substantially identical to a RSRP received from the first UE; and determining whether a location of the one of the group of second UE is distant from the location of the first UE beyond a predetermined threshold.

8. The device of claim 6, wherein the analyzing the correlation further comprises:

determining whether the first UE has detected a RSRP and subsequently discontinues to detect the RSRP during a predetermined time frame;

determining whether the one or more of the group of second UE detect the RSRP after elapse of the predetermined time frame; and determining a distance between the location of the first UE and the one or more of the group of second UE at the time that the RSRP has detected by the one or more of the group of second UE.

9. The device of claim 1, wherein the operations further comprise generating a global database registry of unique cell identification for non-terrestrial cells.

10. A non-transitory machine-readable medium, comprising executable instructions that, when executed by a processing system including a processor, facilitate performance of operations, the operations comprising:

receiving a first physical cell identity (PCI) of a first neighbor cell from a first user equipment (UE) operating in a first terrestrial service cell;

upon determination that the first PCI is unknown, requesting the first UE to read and report extended first neighbor cell information; and obtaining an IP address of the first neighbor cell from a mobile core network;

receiving information of a second neighbor cell from a group of second user equipment (UE), wherein the second neighbor cell information includes a second physical cell identity (PCI) and cell type information, wherein the cell type information is indicative of a signature or a pattern or a behavior of a non-terrestrial cell, and wherein at least one of the group of second UE operates in the first terrestrial service cell;

upon detection of the cell type information, requesting the group of second UE to read and report extended second neighbor cell information; and requesting the first terrestrial service cell to:

add a neighboring list entry of the first neighbor cell to a neighbor list; and forgo to add a neighboring list entry of the second neighbor cell to the neighbor list.

11. The non-transitory machine-readable medium of claim 10, wherein the operations further comprise:

performing a handover from the first terrestrial service cell to the first neighbor cell based on a movement of the first UE; and performing no handover from the first terrestrial service cell to the second neighbor cell.

12. The non-transitory machine-readable medium of claim 10, wherein the operations further comprise determining that the received cell type information represents anomalies that are unobtainable from a terrestrial cell type.

13. The non-transitory machine-readable medium of claim 12, wherein the anomalies include detecting substantially simultaneously the second PCI and a substantially identical signal strength by the first UE and the group of second UE that are spaced apart.

14. The non-transitory machine-readable medium of claim 12, wherein the anomalies include detecting sequentially the second PCI and a substantially identical signal strength by the first UE and the group of second UE within a predetermined time interval.

15. The non-transitory machine-readable medium of claim 12, wherein the anomalies include detecting the second PCI and a signal strength that changes rapidly from a detection time point by one of the group of second UE, where the one of the group of second UE having zero mobility detects the rapidly changing signal strength.

16. A method, comprising:

receiving, by a processing system including a processor, a first physical cell identity (PCI) of a neighbor cell from a first user equipment (UE);

receiving, by the processing system, additional neighbor cell information;

determining, by the processing system, whether the first PCI is unidentifiable or unknown;

analyzing, by the processing system, a correlation among the first PCI, the additional cell information and a location of the first UE to recognize a signature or a pattern or a behavior of the neighbor cell;

requesting, by the processing system, an Evolved Universal Terrestrial Radio Access Network (EUTRAN) Cell Global ID (ECGI) of the neighbor cell and receiving from the first UE; and based on the ECGI and the recognized signature or pattern or behavior of the neighbor cell, determining, by the processing system, that the neighbor cell is a non-terrestrial cell.

17. The method of claim 16, further comprising:

upon the determination that the neighbor cell is the non-terrestrial cell, performing, by the processing system, no handover to the neighbor cell from a current service cell.

18. The method of claim 16, further comprising:

upon the determination that the neighbor cell is the non-terrestrial cell, mandating, by the processing system, a current service cell of the first UE to discard a neighbor list entry corresponding to the neighbor cell.

19. The method of claim 16, further comprising:

upon the determination that the neighbor cell is the non-terrestrial cell, mandating, by the processing system, a current service cell of the first UE to flag a neighbor list entry corresponding to the neighbor cell as the non-terrestrial cell without discarding the neighbor list entry.

20. The method of claim 16, further comprising generating, by the processing system, a global database registry of unique cell identifications for non-terrestrial cells which include the ECGI of the neighbor cell.

* * * * *